United States Patent [19]

Kidwell

[11] 4,448,832

[45] May 15, 1984

[54] DIMENSIONALLY WOVEN COMPOSITE

[76] Inventor: William J. Kidwell, 408 E. 5th St., Port Angeles, Wash. 98362

[21] Appl. No.: 488,194

[22] Filed: Apr. 25, 1983

[51] Int. Cl.³ .................... A47B 13/00; D03D 15/00; H01S 3/02
[52] U.S. Cl. .................... 428/113; 52/648; 108/161; 139/420 A; 330/4.3; 350/321; 372/107; 372/109; 428/105; 428/257; 428/902
[58] Field of Search ............... 428/105, 113, 257, 902; 139/420 A; 330/4.3; 372/107, 109; 350/321; 108/161

[56] References Cited

U.S. PATENT DOCUMENTS

| | | | |
|---|---|---|---|
| 3,546,049 | 12/1970 | Kostich | 428/591 |
| 3,599,107 | 8/1971 | Knudsen | 372/55 |
| 3,763,442 | 10/1973 | McMahan | 372/34 |
| 4,193,828 | 3/1980 | Moores et al. | 428/257 |
| 4,219,597 | 8/1980 | Maistro | 428/105 |
| 4,252,588 | 2/1981 | Kratsch | 428/113 |
| 4,259,821 | 4/1981 | Bush | 428/902 |
| 4,268,560 | 5/1981 | Maistro | 428/113 |
| 4,328,272 | 5/1982 | Maistro | 428/902 |
| 4,366,658 | 1/1983 | Maistro | 428/105 |
| 4,400,421 | 8/1983 | Stover | 428/105 |

Primary Examiner—James C. Cannon
Attorney, Agent, or Firm—William I. Beach

[57] ABSTRACT

A three dimensional woven composite is constructed of strands of graphite composite forming a basic geometric structure comprising a combination of regular octahedron and tetrahedron prisms alternately and regularly spaced. The framework of the geometric structure has one central intersection made up of twelve arms of strands and adjacent incomplete intersections of four or seven arms or strands.

16 Claims, 7 Drawing Figures

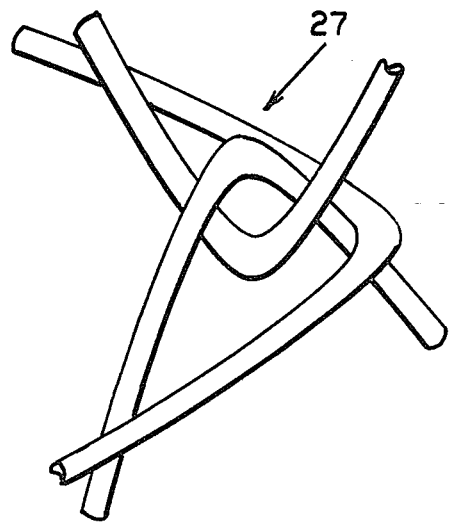
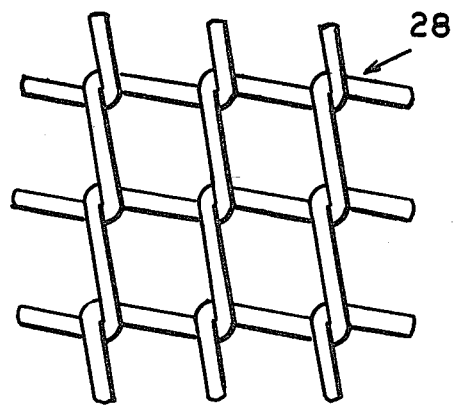
FIG. 4        FIG. 5
FIG. 6
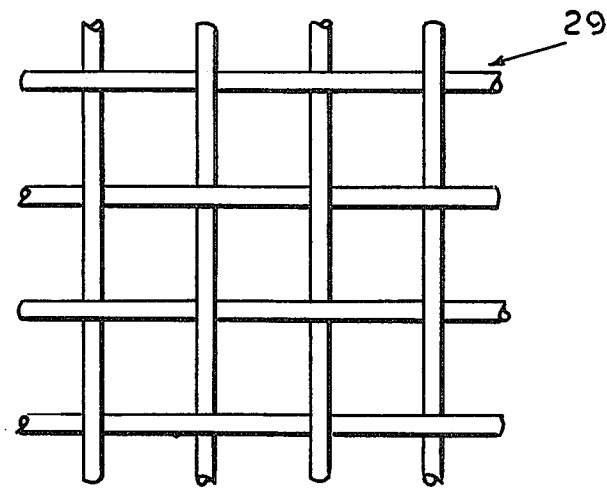
FIG. 7
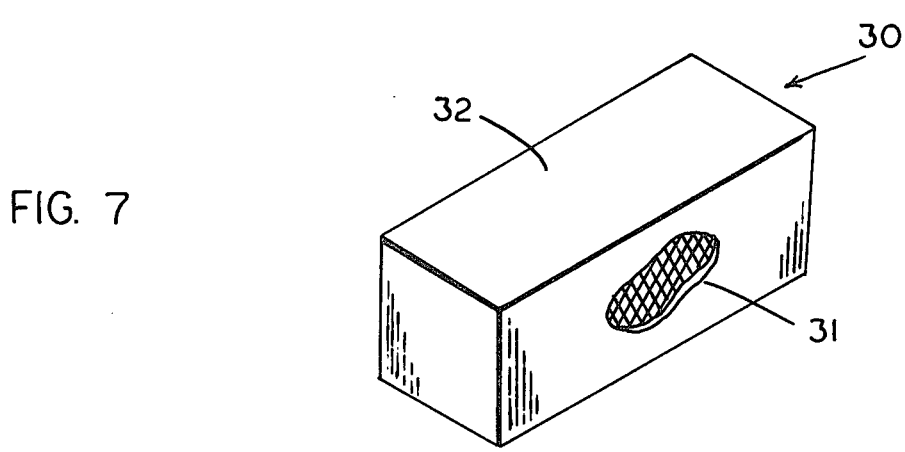

DIMENSIONALLY WOVEN COMPOSITE

BACKGROUND OF THE INVENTION

1. Field of the Invention

The present invention relates to reinforced construction in general and, more particularly, woven reinforced construction which provides a lightweight, dimensionally stabilized framework.

2. Description of the Prior Art

A novelty search in the field of lightweight construction designed particularly for laser applications disclosed no pertinent prior art that fully solved the problems inherent in many of the laser operations.

About half of all laser applications involve the use of some sort of "interference" which is a means of causing a laser beam to cancel itself out and taking note of how this happens. Interference technology, because distances as small as fractions of the wavelength of light are involved, requires the most exacting dimensional stability in all supporting equipment. Mirrors, lenses and other components must be located on an "optical bench" for example, as precisely as possible in relation to each other.

Thermal effects are a problem. Temperature changes can cause interference fringes which should be stationary, to zip past in a steady stream. This problem is so sensitive that if an operator should happen to place his hand on a laser support the system can produce enough heat to cause the same effect. Thermal instability in the laser support system is critical.

Another major problem in interferometry is vibration. Even seismic vibrations coupled from the earth must be isolated. A common strategy is to supply sufficient mass in the support so that its inertia will cancel out the effects of vibration. However, the use of a multi-ton granite block for an optical bench usually contends with the problem of the block supporting its own weight. Also, some large masses tend to have natural resonances so that certain acoustic frequencies are amplified, not reduced.

In view of the above problems it is obvious that laser support equipment and the like require a dimensionally stable, zero expansion structure capable of distributing internal stresses uniformly throughout the system.

One general approach to the aforementioned problems is a three dimensional structure which exploit graphite and other composites involving some sort of "honeycomb", which is hexagonal piping that resemble that found in beehives. The honeycomb principle is used in everything from space telescope to the ailerons on airliners. The honeycomb structure is far too complex to weave from carbon fibers and normally requires hand assembly of any material. It is an expensive operation.

Aside from the honeycomb system there are several prospects that may well produce a lightweight structure of carbon fibers. One is known as the "socket method" which proposes to use carbon rods or lengths of stiff fiber struts. One end of the struts is inserted in a socket member having a plurality of cup-like projections extending angularly therefrom to receive the inner ends of the struts. The struts fan outwardly and have the outer end enclosed in caps.

Experience has shown that in the socket method a completed structure will develop cumulative tolerances which produce gaps between the struts within the socket member. In this case the thermal expansion of the socket comes into play. This could be disastrous because if an assembly of sockets and struts have variable gaps, which tend to happen, the dimensional stability of a structure is lost.

In another case whereby a woven structure may be achieved is by the so-called "junction method". Here the bundle of carbon fibers fork outwardly in angular directions from a fixed junction of fibers. The problem with the fixed junction method is that the strut of fibers are ridgedly held at the junction and expansion in the radial direction produces a vector in the axial direction of adjoining struts. This would obviously produce an accumulative positive expansion greater than the negative expansion (shrinkage) in the struts and the desirable property of zero expansion throughout the structure is then impossible to obtain.

Further search disclosed several patents relating to carbon formed structures. Of such patents of interest there were two having to do with methods of forming carbon composites. These are U.S. Pat. Nos. 4,193,828, and 4,252,588. Both produce products or structures which do not read on the structural design and results achieved by the present invention.

Four patents, namely, U.S. Pat. Nos. 3,599,107, 3,546,049, 3,763,442, and 4,219,597 show composites which are used or may be used in structural concepts.

U.S. Pat. No. 3,546,049 shows the joining of at least four beams oriented on a non-Cartesian axes with rigidity or foldability as required, each beam having elongated component elements, the axes of the beams joined preferably meeting at a common point, the elements crossing but not intersecting in a region of beam intersection, the beams being interleaved in fixed and regular patterns.

U.S. Pat. No. 3,763,442 shows a device for cooling an ion laser plasma tube based on the utilization of a thermal conductor adapted to become fused to an ion laser plasma tube in such a manner as to efficiently transfer the heat generated to a surrounding cooling medium while mechanically adjusting to differential thermal expansion and contraction of the plasma tube.

U.S. Pat. No. 3,599,107 shows a gas laser including a quartz insulator tube enclosing a stack of graphite discs having a central aperture forming a laser discharge path wherein the individual discs are spatially separated and electrically insulated from one another by quartz rods inserted into spacer holes disposed about the central apertures, the depth of the spacer holes in the discs intermediate the end discs being constructed and arranged in a manner to compensate for thermally induced variations in the length of the stack.

U.S. Pat. No. 4,219,597 shows a structure comprising more than four bundles each constituted by a plurality of regularly spaced, parallel, rectiliner elements, the directions of at least five of each bundles being oriented parallel to at least five of the ten directions defined by the lines connecting the non-contiguous vertexes of a parallelepiped in twos and the bundles taken in threes not constituting a system in which each bundle is perpendicular to the other two.

From the information cited above concerning materials, construction techniques and potential results none of the references will produce a regular, three dimensional geometric matrix having the property of zero expansion and uniform distribution of stresses throughout the three planes of the structure. The present invention provides such a structure which solves the problems mentioned for laser application, and many application in other fields.

SUMMARY OF THE PRESENT INVENTION

In carrying out the principles of the present invention in accordance with a preferred embodiment thereof a three dimensional woven composite has at least one bundle of elongated graphite threads contiguously connected around a common point in a completely oriented, central intersection. The threads extend outwardly from the central intersection to connect with threads at adjacent intersections of alternately spaced regular octahedronal and tetrahedronal segments of a basic geometric structure having complete and incomplete intersections capable of being extended to complexity.

BRIEF DESCRIPTION OF THE DRAWING

FIG. 4 is another fragmental view of an incomplete intersection showing a three thread wrap in interlocking engagement, FIG. 5 is a partial view of a chain link weave that can be used to construct FIG. 1, FIG. 6 is another partial view of a tabby weave that can be used to construct FIG. 1, and FIG. 7 is a prospective view of a structure, including a cut-a-way section, showing the interior matrix of octa-tetrahedronal linkages of a basic geometric framework, covered with exterior panels adapted for a laser optical bench.

DETAILED DESCRIPTION OF THE PRESENT INVENTION

Now with the development of the present invention it is possible to build a portable laser interferometer system much better than the massive stationary systems. This is made possible by the development of a carbon filament having an important coefficient of expansion property and a weaving technique which make it practical to weave graphite fibers into a three dimensional matrix, and thereby achieving zero expansion of the entire structure in all three dimensions. This subject will be discussed in detail later.

Figure 1:
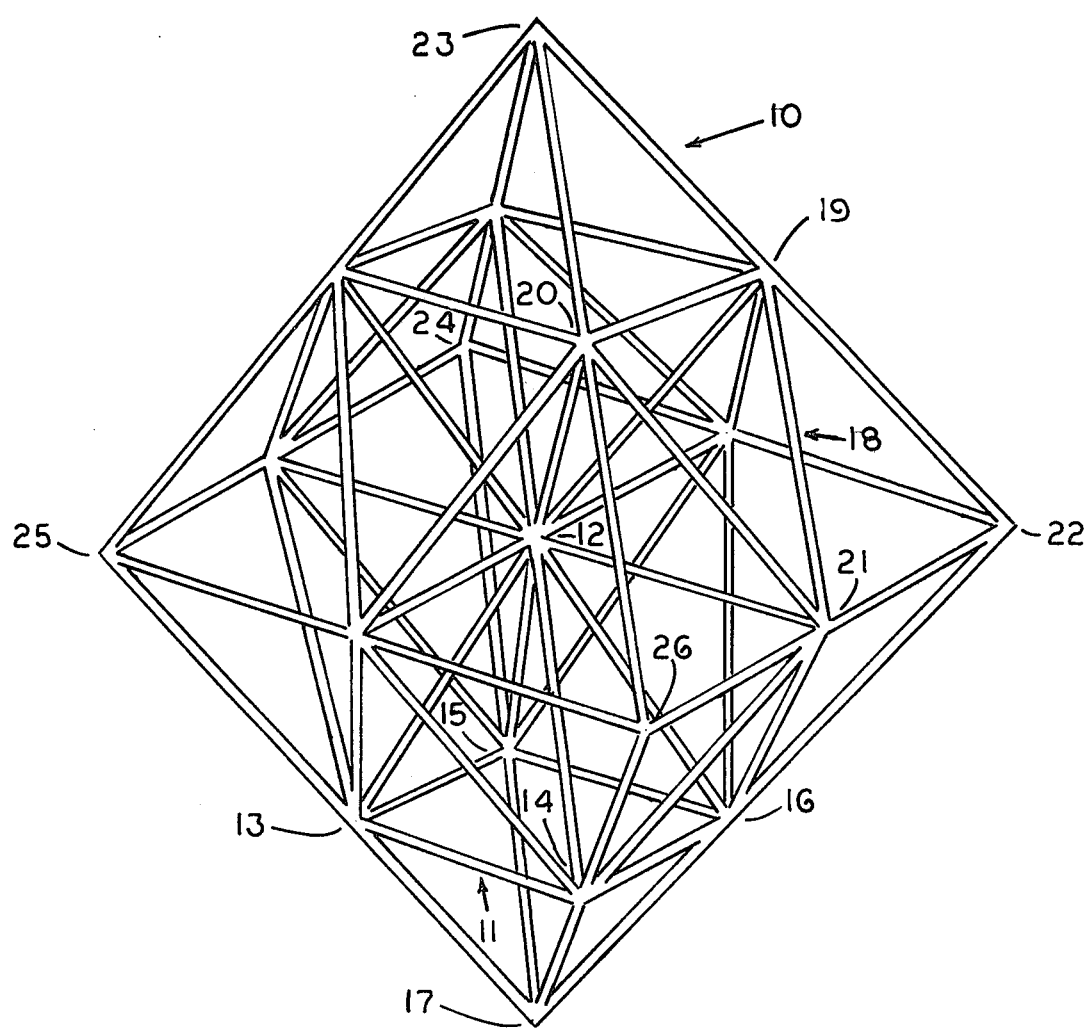
FIG. 1 is a prospective, elevated view of a preferred embodiment of the present invention rotated slightly so as to show the interior arrangement of regular octahedronal and tetrahedronal segments forming a basic geometric structure.
Figure 2:
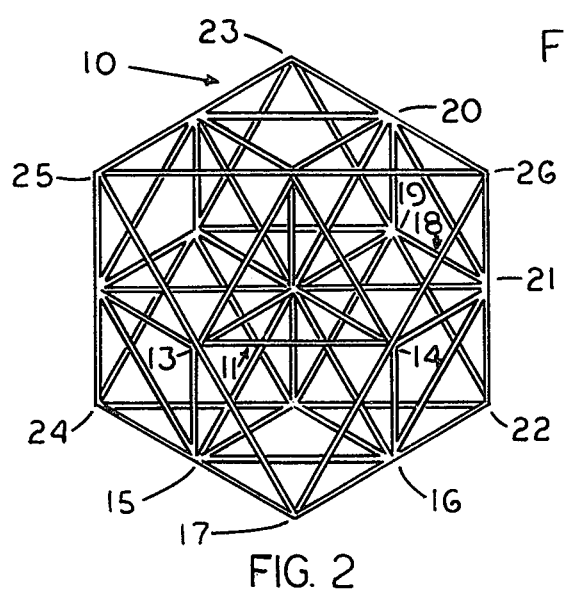
FIG. 2 is a top plan view of FIG. 1.

Referring to FIG. 1 it can be seen that the structure presented defines a basic geometric structure 10. Structure 10 is a regular eight-sided, octahedronal prism comprising a woven body of alternately spaced octahedronal and tetrahedronal linkages. The linkages make up six octahedrons and eight tetrahedrons contained within the basic geometric structure which is also the basic building block of an expanded, larger structure.

To point out and clarify the geometry, reference is again made to structure 10 within which can be seen one of the six octahedrons 11 designated by characters at intersections 12, 13, 14, 15, 16, and 17. The octahedron is formed by links 12-13, 12-14, 12-15, 12-16, 13-14, 13-15, 13-17, 14-16, 14-17, 15-17, and 15-16 and 16-17. Adjacent to octahedron 11 is tetrahedron 18 designated by characters 12, 19, 20 and 21. Likewise, the tetrahedron is formed by links 12-19, 12-20, 12-21, 19-20, and 20-21 and 19-21. The interconnection of alternately spaced octa-tetrahedrons is shown by the complete central intersection 12, which extends links 12-19, 12-20 and 12-21 into tetrahedron 18, and links 12-13, 12-14, 12-15, and 12-16 in octahedron 11. To avoid a lengthy discussion covering the linkage of central intersection 12 with other octa-hedrons in structure 10, further discussion will be confined to the above described examples. To further define the scope and boundary of structure 10, the vertices are designated by characters 17, 22, 23, 24, 25, and 26. Each of the six vertices is an incomplete intersection formed by four links. The intermediate incomplete intersections, for example, intersection 16, located between vertex 17 and 22, is formed by seven links. There are 12 intermediate incomplete intersections in all. Altogether structure 10 is constructed of 64 links including the linkage of the complete central intersection 12 and all incomplete intersections.

It is necessary to incorporate the octahedron in structure 10 because of the basic requirement for the regularity and, therefore, the ease of manufacture of components. A system of regular tetrahedrons only would be more stable in all planes but, unfortunately, extended tetrahedrons form a pentagon, a shape which is not stoichiometric and angular compromise would have to be made. The few right angle links which the octahedron introduces are enough for structure 10 to result in a desirable stoichiometry, with only a minor loss of sheer strength in the direction parallel to the right angle plane.

Figure 3:
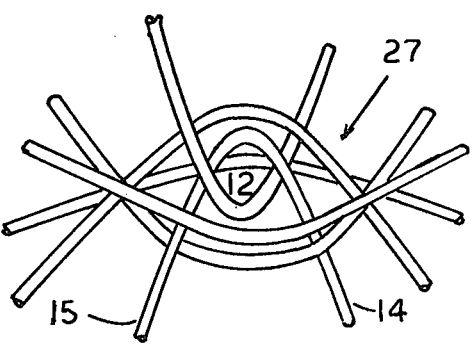
FIG. 3 is a fragmental view of the central intersection showing the angular extension of a bundle of threads to adjacent intersections of octahedronal and tetrahedronal segments seen in FIGS. 1 and 2.

As seen in structure 10 the complete central intersection 12 has twelve links which comprise a single bundle of six graphite threads wrapped around a point in intersection 12. FIG. 3 presents a fragmental view of bundle 27 showing the twelve links disposed in interlocking and angular relationship to each other. Although it can not be shown clearly in this view, four of the links are connected at 90° angles to each other and eight lengths at 60° or 120° angles. FIG. 4 presents a fragmental view of bundle 27 including a three thread wrap of carbon fibers showing the interlocking engagement of threads at an intersection.

The interlocking feature of bundle 27 not only provides a secure junction for the fibers but, also, they can expand in the radial direction. Therefore, upon an increase in temperature the bundle will grow in size significantly in the radial direction together with a corresponding shrinking of the fibers in the axial direction, or along the length of the bundle. A negative coefficient of expansion, being an important property of the carbon fiber, is a rarity in nature. Nevertheless, the development of the subject fiber by Union Carbide Company has made it possible to weave threads of the fiber into the basic geometric structure of FIG. 1. Furthermore, the negative co-efficient of expansion of the fiber in the axial direction along with an increase in the width or thickness of the bundle in the radial direction, upon an increase in temperature, contribute to the property of zero expansion of structure 10 in all three dimensions.

To achieve the three-dimensional, zero expansion of structure 10 with an anisotropic carbon fiber, the following two conditions were met in the construction:

1. The radial direction of the fiber must have some place to expand to, and therefore the structure must provide a significant amount of empty space with the matric.

2. Loading must be done in the axial direction (the negative expansion direction) of the fiber.

The weave used in the present invention is the "octatetrahedronal" pattern. The matrix thus produced provides for uniform loading such that, anywhere in the structure, pressure applied in one direction will produce stress evenly throughout the entire structure in all directions. This property, coupled with the fact that graphite composite is one of the stiffest material known (with five times the strength-to-weight ratio of steel), provides a lightweight structure which is extremely ridged and zero expansion in all three planes.

Structure 10 can be woven by two different patterns.

FIG. 5 shows the so-called "chain link" form 28 and FIG. 6 illustrates the "tabby" for 29. The use of the chain link weave will make stronger intersections of carbon fiber because of the greater number of contacts possible in each thread. However, the tabby weave would be easier from a production standpoint because only two wraps of fibers would be necessary at an intersection instead of three, and zero expansion would be easier to obtain. Hence, it is more desirable to use the chain link weave where strength is most important and the tabby weave where zero expansion is most important.

FIG. 7 illustrates construction of an optical bench 30 in support of a laser system designed to replace the standard granite block type bench. The rectangular structure exhibits a cut-away view of the octa-tetrahedronal matrix. The structure is completed by bonding a suitable skin 32, such as a fiberglass reinforced polyester sheet, to the top, sides, and bottom. The woven structure of octa-tetrahedron linkage provide efficient and effective means for distributing large stresses throughout with practically no change in the dimensional stability of the entire structure.

From the illustration and description of the present invention, it is obvious that it has many important advantages which can be utilized to benefit present and future laser applications.

The foregoing description is to be clearly understood to be given by illustration and example only, the spirit and scope of the present invention being limited solely by the appended claims.

I claim:

1. A three dimensional woven composite comprising at least one bundle of elongated graphite threads contiguously connected around a common point in a completely oriented central intersection, and extending outwardly therefrom to adjacent intersections of alternately spaced regular octahedronal and regular tetrahedronal linkages of a basic geometric structure having complete and incomplete intersections capable of being extended to complexity.

2. A composite as set forth in claim 1, wherein:
the bundle comprises a set of six threads contiguously connected around said intersectons.

3. A composite as set forth in claim 1, wherein:
the linkages include 12 links disposed angularly around the central complete intersection and either four or seven links around incomplete intersections.

4. A composite as set forth in claim 3, wherein:
there are four links of threads disposed at 90° angles, and eight links at either 60° or 120° angles respectively at said central complete intersection.

5. A composite as set forth in claim 3, wherein:
there are four links of thread at 90° angles at each four link intersection, and three links at 90° angles and four links at 60° or 120° angles at each seven link incomplete intersections.

6. A composite as set forth in claim 1, wherein:
the composite contains six complete octahedronal linkages adapted to form an octahedronal shaped basic geometric structure.

7. A composite as set forth in claim 6, wherein:
the octahedronal shaped framework has significant empty space among the linkages to allow it for maximum expansion of said links in the radial direction and zero expansion of the entire framework in all three directions.

8. A composite as set forth in claim 1, wherein:
said composite provides the matric for uniform stress load—such that when pressure is applied anywhere in one direction it will produce stress evenly throughout the entire matrix.

9. A three dimensional woven composite comprising at least one bundle of elongated strands of graphite composite contiguously interlocked angularly around a common point in a completely oriented intersection wherein the strands extend outwardy to form adjacent intersections of alternately spaced regular octahedronal and regular tetrahedronal linkages of a basic geometric structure having a plurality of complete and incomplete intersections of linkages capable of being extended to complexity.

10. A composite as set forth in claim 9, wherein:
the bundle comprises six twisted strands contiguously wrapped around said intersections.

11. A composite as set forth in claim 9, wherein:
the linkages comprise a central complete intersection of twelve links extending angularly to alternately spaced incomplete intersections of either four or or seven links.

12. A composite as set forth in claim 11, wherein:
there are four links of strands disposed at 90° angles and eight links at 60° or 120° angles complete intersection, and four links of strands disposed at 90° angles at each of the four link intersections as well as three links at 90° and four links at 60° or 120° angles at each seven link incomplete intersections.

13. A composite as set forth in claim 9, wherein:
said strands are spun fron carbon fibers which has a negative co-efficient of expansion that produces a shrinkage in the axial direction along with an expansion of width of the strand in the radial direction.

14. A composite as set forth in claim 9, wherein:
the basic geometric structure comprises six octahedronal linkages and eight tetrahedronal linkages disposed in alternated spaced relationships in an octahedronal shaped basic geometric structure.

15. A composite as set forth in claim 13, wherein:
there is substantial empty space within said basic geometric structures for sufficient shrinkage in the axial direction and expansion in the radial direction to achieve zero expansion of the entire structure in all three dimensions.

16. A composite as set forth in claim 9, wherein:
said basic geometric structure provides a dimensionally stable platform whereupon when pressure is applied anywhere in one direction the stress is distributed uniformly throughout the entire structure.

* * * * *